United States Patent

[19]

Black et al.

[11] Patent Number: 6,162,532

[45] Date of Patent: Dec. 19, 2000

[54] MAGNETIC STORAGE MEDIUM FORMED OF NANOPARTICLES

[75] Inventors: Charles T. Black, White Plains; Stephen M. Gates, Ossining; Christopher B. Murray, New York; Shouheng Sun, Ossining, all of N.Y.

[73] Assignee: International Business Machines Corporation, Armonk, N.Y.

[21] Appl. No.: 09/127,453

[22] Filed: Jul. 31, 1998

[51] Int. Cl.[7] .................................................. G11B 5/66

[52] U.S. Cl. ........................ 428/323; 428/328; 428/329; 428/694 T; 428/694 TS; 428/694 TP; 428/694 B; 428/694 BA; 428/900; 427/128; 427/19; 427/130; 427/131

[58] Field of Search .................... 428/694 T, 694 TS, 428/694 TP, 694 B, 694 BA, 323, 900, 328, 329; 427/128, 129, 130, 131

[56] References Cited

U.S. PATENT DOCUMENTS

| | | | |
|---|---|---|---|
| 5,505,996 | 4/1996 | Nagayama | 427/123 |
| 5,766,764 | 6/1998 | Olli | 428/407 |
| 5,843,569 | 12/1998 | Kaitsu | 428/323 |

*Primary Examiner*—Leszek Kiliman
*Attorney, Agent, or Firm*—McGinn & Gibb, P.C.

[57] ABSTRACT

A magnetic storage medium is disclosed which is formed from a layer of substantially uniformly spaced-apart magnetic nanoparticles of substantially uniform diameter disposed upon a surface of a substrate, with a coating, preferably of abrasion-resistant material, applied to adhere the nanoparticles to the substrate and to maintain their substantially uniform spaced-apart relationship. The nanoparticles are formed from a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite.

20 Claims, 6 Drawing Sheets

MAGNETIC STORAGE MEDIUM FORMED OF NANOPARTICLES

CROSS-REFERENCE TO RELATED APPLICATIONS

This application is related to application Ser. No. 09/127,005, now pending, entitled "METHOD OF PRODUCING NANOPARTICLES OF TRANSITION METALS", filed on the same date herewith, by Christopher B. Murray and Shouheng Sun, which application is incorporated herein by reference.

FIELD OF THE INVENTION

The present invention relates to a magnetic storage medium of very high information bit storage density. More particularly, the invention relates to a magnetic storage medium utilizing magnetic nanoparticles to form a layer on a substrate.

BACKGROUND OF THE INVENTION

Patterning a substrate is critical to fabrication of integrated circuits and data storage media. The limitations of conventional lithographic patterning for dimensions below 0.1 micron (100 nm.) are well known, and are described in "Lithography for ULSI", by S. Okazaki, in a review paper (p. 18, vol. 2440, Proceedings of SPIE). Optical lithography with a light source in the deep ultra-violet ("DUV") is expected to serve in circuit and media fabrication for feature sizes down to about 0.05 micron (50 nm), but not for smaller sizes. At present, there are no inexpensive methods for lateral patterning/texturing of solid substrates on a 1 to 50 nm scale, which is much smaller than the present lithographic feature size.

DUV optical lithography is currently anticipated to be extended to lateral dimensions of ~50 nm, but such extension is not certain and may be expensive. At dimensions below ~50 nm X-ray lithography and Extreme UV lithography are being considered but both require enormous capital investments (both for the radiation sources and the supporting optical systems). Direct write systems including electron beam and scanning probe based lithography are in development, but the serial nature of the patterning process makes these prohibitively slow for manufacturing. Micro-contact printing and nano-imprint lithography are new patterning techniques which hold some promise in and around 50 nm feature sizes but these methods are not well proven at the present. It would be desirable to have an inexpensive, large area, method for lateral patterning that does not require lithography, and that is suitable for feature sizes below 50 nm.

In the case of magnetic storage media, for example tapes and disks having coatings of magnetic particles thereon, a number of difficulties prevent attainment of high densities. For example, where the usual coatings of magnetic particles are applied on flexible media, wide variations in individual particle diameters raise the minimum information bit storage size, and thus decrease the attainable areal information bit storage density. In the case of conventional rigid magnetic storage media, sometimes called "hard drive" disks, magnetic films are often applied by sputter deposition. The resultant broad distribution of grain sizes and inter-granular spacings creates both low effective areal bit densities and undesirably low signal-to-noise ratios. Even where magnitudes and uniformity of the diameters of the particles is acceptable, the strong magnetic interaction of the particles often causes significant increases in minimum information bit storage size due to agglomeration of mutually magnetically attractive particles into clumps of particles, thereby decreasing attainable areal information storage bit density (e.g. as measured in bits per square inch). In fact, currently attainable areal information storage bit densities are about 10 gigabits per square inch although some developers hope to achieve 40 gigabits per square inch by the year 2010 A.D.

Methods to make monodisperse magnetic particles (cobalt, for example) with a diameter in the 5–50 nm range have been described by Murray et al in the aforementioned U.S. patent application Ser. No. 09/127,005, now pending, filed simultaneously herewith. Specifically, this Murray et al patent application describes formation of magnetic cobalt (Co) particles with mean diameter D, where D=8 to 10 nm., and with a standard deviation in the size distribution of 5%.

Methods for self-assembly of 40–70 nm. particles made of latex or other polymer are described by Micheletto et al in Langmuir, 1995, v. 11, p 333 and by Du et al in Langmuir, 1997, v. 11, p. 2538. A general method to form a thin film of small particles is described by Nagayama in U.S. Pat. No. 5,505,996. Moreover, formation of ordered arrays of 5–10 nm size semiconductor particles is described by Murray et al in Science, 1995, v. 270, p. 1335 and by Dabbousi et al in Chemistry of Materials, 1994, v.6, p.216. None of the prior art references teach magnetic storage media nor methods of making ordered arrays from particles that have strong magnetic interactions which cause agglomeration and other problems.

SUMMARY OF THE INVENTION

It is a general object of the present invention to make a highly ordered, periodic, array in the form of a layer (whether a monolayer or a multilayer) of magnetic particles having diameters not exceeding 50 nm, and to stabilize said array on a substrate surface, despite the strong tendency of such magnetic particles to agglomerate together due to magnetic interaction and thus prevent the formation of such an ordered layer.

It is another general object of the present invention to control the spacing (separation distance) between the nm-scale magnetic particles comprising said array, with the spacing on the order of 1–10 nm.

It is a specific purpose of the present invention to use magnetic particles of a selected magnetic material in said array, to overcoat the magnetic particle array with a robust protective film, and hence to make a magnetic storage medium having an areal bit density exceeding 100 gigabits per square inch and even approaching as high as $10^{12}$ bits (1 Tbit) per square inch.

It is a further object of the present invention to use simple chemical self-assembly procedures (not lithography or contact printing) to make the aforesaid ordered arrays of nm-scale particles on the surface of a substrate.

The present invention therefore provides a magnetic storage medium comprising:

a) a substrate having a surface, b) a layer of particles disposed in a substantially uniformly spaced-apart relationship upon the aforesaid surface, the particles having a substantially uniform diameter not exceeding 50 nanometers and comprising a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite, and c) a coating surrounding the particles and adhering to the surface to maintain the aforesaid substantially equally spaced-apart relationship.

Preferably, the magnetic storage medium comprises an abrasion-resistant coating disposed over the particles to protect them from abrasion, the abrasion-resistant coating preferably comprising a material selected from the group consisting of diamond-like-carbon, amorphous carbon, amorphous silicon, aluminum oxide, and silicon oxide. Optionally, the magnetic particles may have a substantially uniform diameter not exceeding 20 nanometers and may be coated with a noble metal material selected from the group consisting of gold, silver, platinum, and palladium.

Furthermore, the layer may comprise a multilayer formed of substantially equally spaced-apart particles disposed at a plurality of distances from the surface of the substrate. In one specific exemplary form, such a multilayer may comprise a first monolayer of particles having the aforesaid coating to maintain them in spaced-apart relationship and a second monolayer of particles disposed over the aforesaid coating.

According to another embodiment, an affinity layer may be disposed between the magnetic particles and in a selected pattern overat least part of the surface of the substrate, the affinity layer being composed of an affinity material adapted to preferentially attract and retain said particles in the aforesaid selected pattern over the substrate surface. Such an affinity material may comprise bi-functional molecules which can be expressed generally in the form X-R-Y where X and Y are the active head groups and R is a hydrocarbon or flourocarbon chain preferably containing 3–22 carbon atoms.

The functional groups X and Y are chosen from:

| | |
|---|---|
| sulfonic acids | R—$SO_2OH$ |
| sulfinic acids | R—SOOH |
| phosphinic acids | $R_2$POOH |
| phosphonic acids | R—OPO$(OH)_2$ |
| carboxylic acids | R—COOH |
| thiols | R—SH |
| trismethoxysilane | R—Si$(OCH_3)_3$ |
| trisethoxysilane | R—Si$(OCH_2CH_3)_3$ |
| trichlorosilane | R—SiCl$_3$ |

In a given affinity molecule the chemical functional groups X and Y may be the same although they are generally not, because the substrate surface and the nanoparticle surface are generally comprised of different materials.

One example of an affinity layer is trismethoxysilylpropane thiol, which may be expressed as $(CH_3O)_3Si$—$CH_2$—$CH_2$—$CH_2$—SH, which selectively binds noble metal coated nanocrystals to silicon oxide surfaces.

For the purpose of the present application, "substantially uniform diameter" shall be understood to mean that the magnetic particles have diameters characterized by a standard deviation of less than 10% of their average.

The present invention also provides a method of forming a magnetic storage medium upon a surface of a substrate comprising the steps of:

a) preparing a liquid dispersion, in a solvent, of magnetic particles coated with organic stabilizer material, said magnetic particles having a substantially uniform diameter not exceeding 50 nanometers, said particles comprising a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite, b) applying said liquid dispersion to said surface of said substrate, and c) evaporating said solvent to thereby form, upon said surface of said substrate, a layer of said magnetic particles coated with said organic stabilizer material, said magnetic particles being maintained in substantially uniformly spaced-apart relationship upon said surface by said organic stabilizer material.

Preferably, the method comprises the further steps of d) removing the organic stabilizer material, and e) depositing an adherent coating, which may optionally be abrasion-resistant, over the magnetic particles to maintain them in the aforesaid substantially uniformly spaced-apart relationship.

Optionally, removal of the organic stabilizer material is carried out by evaporation using at least one of heating, dry etching, and vacuum.

Preferably, the organic stabilizer material comprises a long chain organic compound of the form R-X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from carboxylic acid, phosphonic acid, phosphinic acid, sulfonic acid, sulfinic acids, and thiol. One desirable choice of organic stabilizer material is oleic acid.

DETAILED DESCRIPTION

Figure 1:
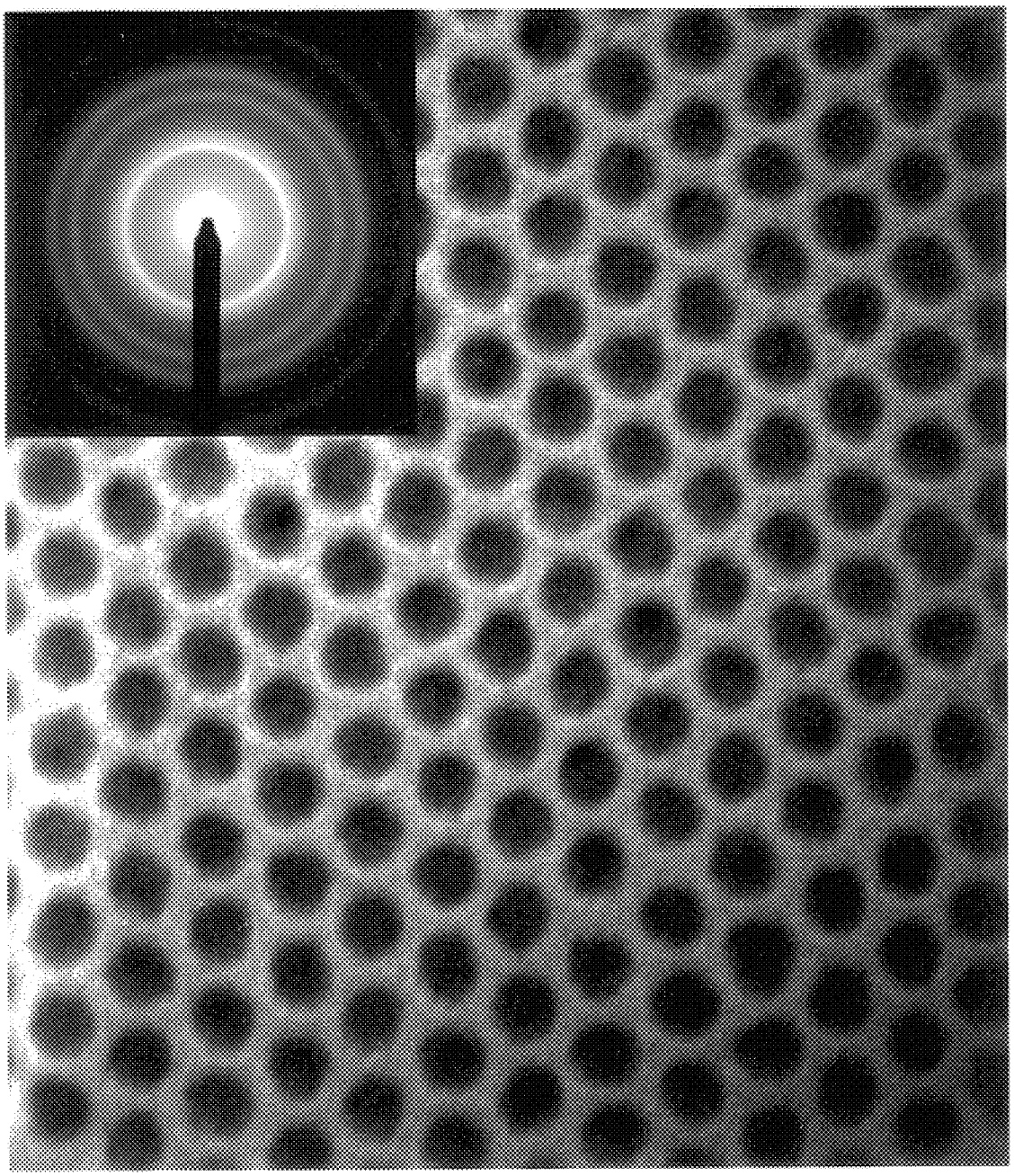
FIG. 1 is a transmission electron micrograph (TEM) photo of an ordered monolayer of Co particles, each black dot being a single 8 nm. diameter Co particle, with an inset showing an electron diffraction pattern from the ordered monolayer (not only from a single particle).

FIG. 1 is a transmission electron micrograph (TEM) photo of an ordered monolayer of cobalt particles, with each black dot being a single 8 nm diameter particle. The dots are regularly separated by the organic stabilizer layer, which appears as the lighter region between the particles. The TEM was recorded at 120 KV electron beam energy on a Philips EM 420 microscope.

Figure 2:
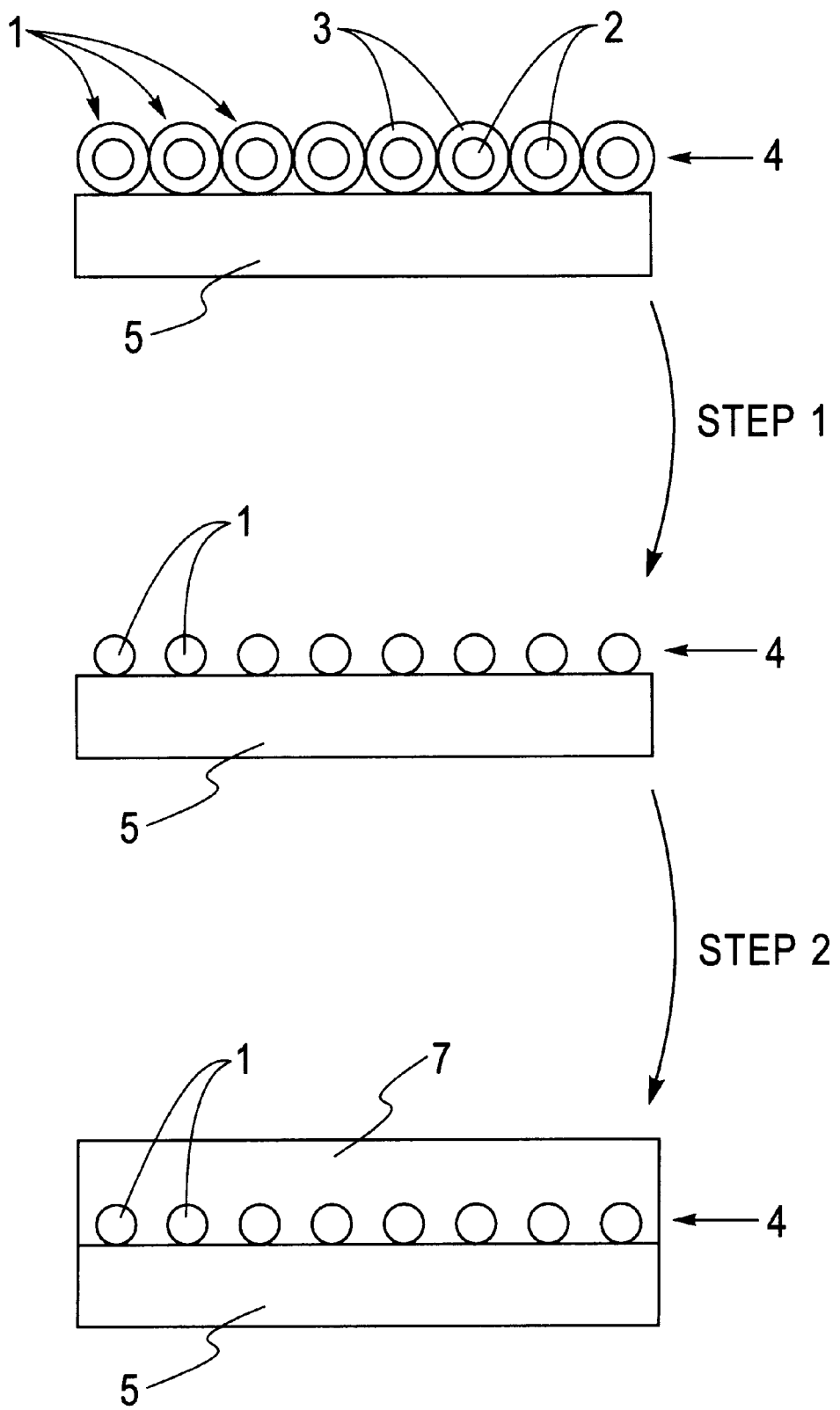
FIG. 2 shows the general steps of a fabrication method for forming a magnetic storage medium of the present invention on a substrate.

FIG. 2 shows the general fabrication method to form the magnetic storage medium of the present invention: creating a periodic array or layer 4 of nm-scale magnetic particles 1 on a substrate 5, and then stabilizing the particles 1 in the positions within layer 4.

First, a monodisperse sample of ferromagnetic particles 1 with diameter of the order 5–20 nm ("nanoparticles") is made according to the methods of the aforesaid patent application Ser. No. 09/127,005, now pending, of Murray and Sun. The particles 1 consist of an inorganic core surrounded by an organic stabilizing layer 3. By correct choice of the organic stabilizing layer 3, the particles 1 are soluble in a hydrocarbon solvent such as dodecane. A bottle containing dodecane and the aforesaid ferromagnetic particles 1 dissolved in the dodecane is prepared according to the method described in the aforesaid Murray et al application Ser. No. 09/127,005, now pending. As a convenient example, the concentration of said particles 1 can be approximately 0.1 grams of particles in 0.01 liter of dodecane.

The magnetic nanoparticles utilized in this invention comprise a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite.

Optionally, the particles may be a CoPt alloy ($Co_n Pt$ with n=1, 3 or 0.33) with CoPt (n=1) being the easiest to fabricate, the compositions of said alloys being uniform throughout the nanoparticle. Optionally, each particle 1 has a 2 layer structure consisting of a ferromagnetic core (Co, Fe, Ni) surrounded by a noble metal layer ("shell" of Pt, Au, Ag, Pd). Such a noble metal shell protects the magnetic core against oxidation, and is also useful in forming covalent links between the particles 1 and the surface of substrate 5. The preferred substrate is a Si wafer, or a glass substrate, with the requirement that the surface is flat. Ideally, the rms roughness of the substrate should be similar to the particle diameter, hereinafter called "D".

The diameter D of the magnetic nanoparticles 1 of this invention is preferably 5–15 nm. An important feature of the present invention is that optimum ordered, periodic formation of monolayer 4 is best achieved when the particles 1 have a substantially uniform diameter—when the size distribution of the nanoparticles is narrow. In particular, it is desired that the standard deviation of the distribution of particle diameters be <10%, with 7% or smaller being preferred. For example the monolayer depicted in FIG. 1 consists of Co particles with a 5% size distribution. It is desirable that the distribution of particle diameters be <10%. It is preferred that the distribution be 7% (or less). While this narrow size distribution is optimum, broader size distributions and monolayer arrays with imperfect ordering may also be formed in accordance with the present invention.

As shown in FIG. 2, the particles 1 comprise the inorganic, magnetic core 2 described above, and are surrounded with an organic stabilizer layer 3 having an effective thickness of about 1–5 nm, with 2–4 nm being preferred. Suitable molecules for this organic stabilizer layer 3 include long chain organic compounds of the form R-X, where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and where X is selected from carboxylic acid, phosphonic acid, phosphinic acid, sulfonic acid, sulfinic acid, and thiol. The effective thickness of the aforesaid organic stabilizer layer 3 may be adjusted by changing the carbon chain length, with Oleic Acid having an 18 carbon chain being an inexpensive and convenient example (2 nm effective thickness).

An ordered layer 4 of the nanoparticles 1 is formed as a monolayer on the substrate 5 by any suitable method. For example, slow evaporation of the solvent from a film of uniform thickness as described in Murray et al, Science, 1995, v. 270, p. 1335, may be used. The dodecane or other suitable solvent is removed by air drying, or heating in an oven to about 40° C. (or slightly higher temperature). The ordered array of the present invention forms as the solvent is slowly removed, and a driving force to form said array is an attractive force between the Oleic acid organic stabilizer layer 3 of mutually adjacent Co particles 1. Several methods may be used to coat a film of uniform thickness of the liquid dispersion containing both particles and solvent, including but not limited to dip coating, spin coating, and coating using a blade moved at controlled speed parallel to the substrate surface.

Alternatively, the Langmuir-Blodgett assembly method as described in M. C. Petty, "Langmuir-Blodgett Films, an Introduction", copyright 1996 by Cambridge Univ. Press, NY. ISBN #0 521 41396 6, may be used to form the ordered monolayer of particles.

Note that wet chemical processing is used up to this point, and that dry, vacuum based processing is used subsequent to this point. The sample is placed in a plasma enhanced chemical vapor deposition (PE CVD) tool, or similar plasma reactor. The organic stabilizer coating 3 may now be removed if desired (see Step 1, FIG. 2). Suitable methods for Step 1 are heating in vacuum, exposure to UV light, and exposure to an oxygen plasma. (If the latter method is used, a hydrogen plasma exposure is used to remove any oxide from the layer 4 of magnetic nanoparticles 1.) . Alternatively, the aforesaid organic stabilizer coating 3 may be left in place.

Before disturbing the ordered layer array 4, and before permitting any repositioning of the nm-scale particles, a protective coating 7 may now be deposited in the encapsulation step (see Step 2, FIG. 2), to hold the nanoparticle 1 of monolayer 4 in place and to protect layer 4. The coating 7 must be hard and adherent to the substrate 5. Suitable materials for the protective overcoating 7 include diamond like carbon (DLC), amorphous C or Si, and oxides such as aluminum oxide or Si oxide. The preferred material for coating 7 is diamond like carbon (DLC), deposited by heating the substrate 5 to about 100 to 300° C., and exposing the sample to a hexane plasma (or similar carbon source molecule). The preferred thickness for coating 7 is at least 10 nm. and may conveniently be 20 to 50 nm in thickness. It will be understood that the coating 7 may be deposited by any suitable method known to those skilled in the art. For example, some methods utilize a plasma enhanced chemical vapor deposition (PE CVD) tool, or a reactive sputtering tool. Moreover, it may be convenient to deposit the coating 7 in the same chamber or tool that may have been used to remove the organic stabilizer layer 3 from the particles 1.

Figure 3:
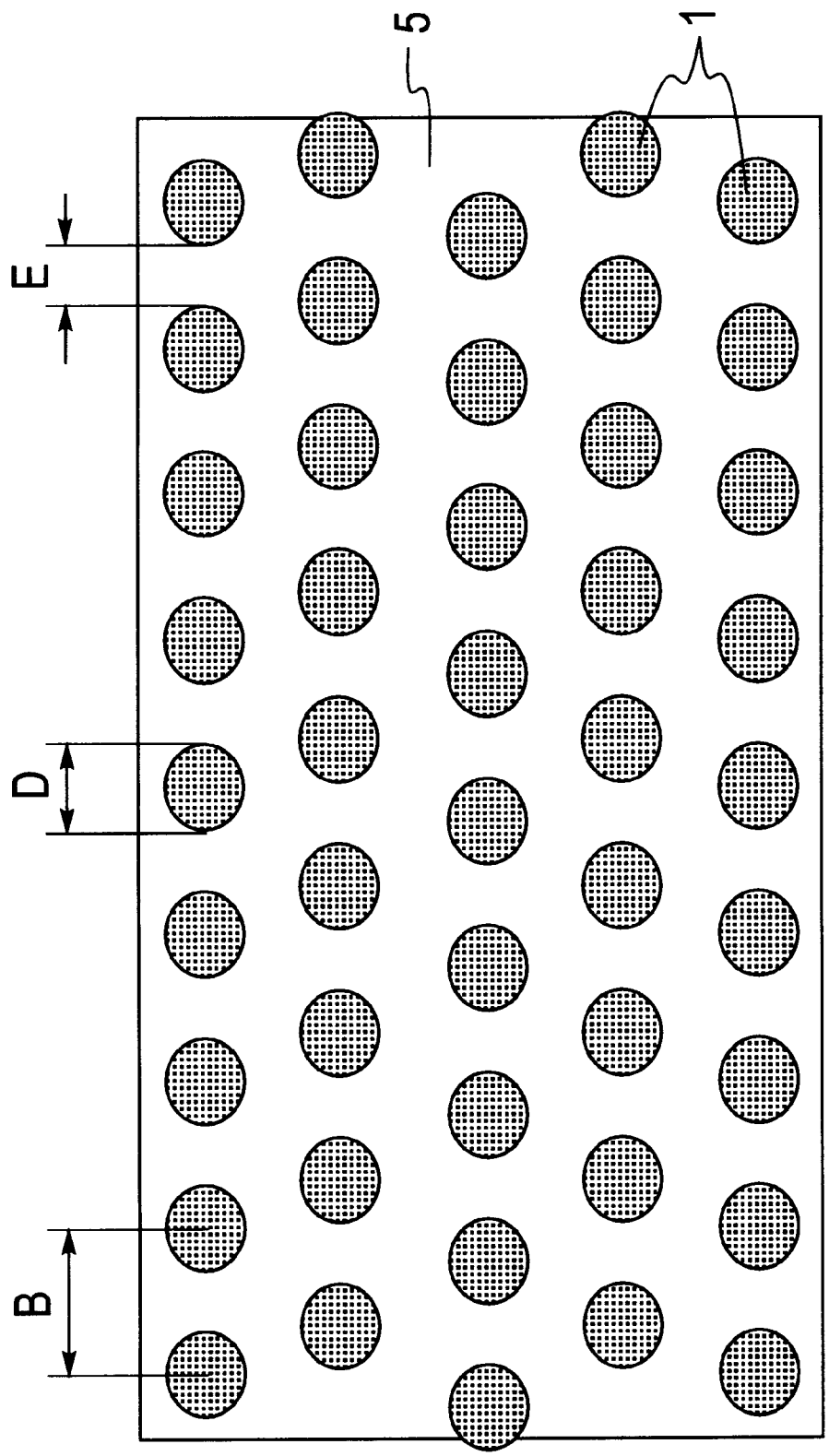
FIG. 3 shows a plan view of the magnetic storage medium of FIG. 2.

FIG. 3 shows a plan view of the preferred embodiment of this invention, after Step 1 of FIG. 2 (the protective overcoating 7 is not shown). The preferred spacing B between bits in the form of nanoparticles 1 is about 12 nm. in this example, the preferred diameter (D) of each Co nanoparticle bit is 8 nm, and the preferred distance between particles (E)

is about 4 nm. ( The distance E is 2× the effective thickness of the organic coat, before removal of said coat. See FIG. 2A.) The resulting information density using 1 magnetic particle/bit, is $6\times10^{12}$ (6 Tbit) per square inch. By contrast, current technology using magnetic thin films rather than magnetic nm-scale particles provides a density on the order of $10^9$ to $10^{10}$ (1 to 10 Gbit) per square inch.

Figure 4:
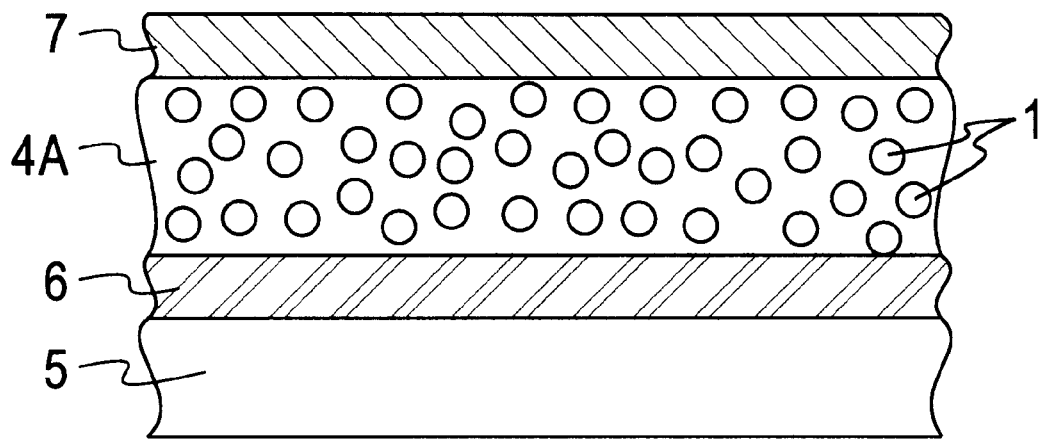
FIG. 4 is a sectional view of a magnetic storage medium based on a multilayer of monodisperse nm-scale Co particles.
Figure 5:
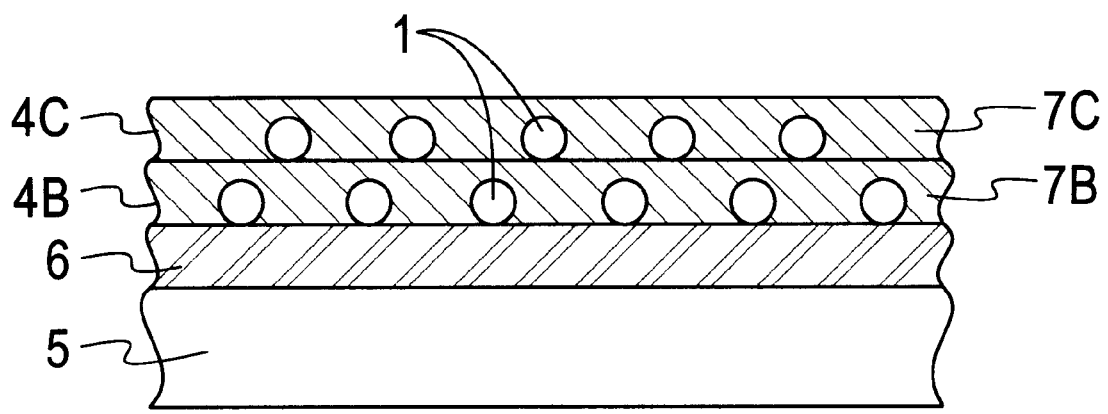
FIG. 5 is a sectional view of an alternative magnetic storage medium based on two ordered monolayers of monodisperse nm-scale Co particles.

The foregoing embodiments efficiently use ordered arrays of nm-scale particles, specifically magnetic particles ordered in a single layer. As will be understood, alternative an embodiment of the ordered arrays of the present invention may use multiple layers of such nm-scale particles. Magnetic recording media based on multiple layers of magnetic particles are especially useful when multiple-valued recording schemes are used, wherein each magnetic recording bit can be assigned >2 values, for example 3 or 4 values, and a greater information storage density is thus achieved. The magnetic recording media shown in FIGS. 4 and 5 are useful for the simple case of the 3 value recording scheme, wherein 3 magnetic states of each bit are defined and the 3 magnetic states are all particles with parallel magnetic moments in the UP direction, all particles with parallel magnetic moments in the DOWN direction, and ½ particles spin UP+½ particles spin DOWN. The multilayer of particles simply places more magnetic particles per unit area than the ordered monolayer, which results in a larger magnetization signal for a given bit area.

FIG. 4 is a section view of a magnetic recording medium based on a multilayer 4A of monodisperse nm-scale Co particles 1. As shown in FIG. 4, the recording medium consists of a substrate 5, an undercoat 6 (coating on the substrate), a multilayer 4A of close packed nm-scale particles 1, and a protective overcoat 7. The substrate 5 may be either rigid (such as glass, or a Si wafer) or flexible, such as a polymeric plastic disc. An undercoat 6, which is applied to the substrate 5 to promote ordered multilayer formation and enables the formation of chemical links between particles 1 and substrate 5, may preferably comprise an affinity material comprising bi-functional molecules of the form X-R-Y, wherein R is selected from hydrocarbon and fluorocarbon chains of between 3 and 22 carbon atoms, and X and Y are selected from:

| | |
|---|---|
| sulfonic acids | R—SO$_2$OH |
| sulfinic acids | R—SOOH |
| phosphinic acids | R$_2$POOH |
| phosphonic acids | R—OPO(OH)$_2$ |
| carboxylic acids | R—COOH |
| thiols | R—SH |
| trismethoxysilane | R—Si(OCH$_3$)$_3$ |
| trisethoxysilane | R—Si(OCH$_2$CH$_3$)$_3$ |
| trichlorosilane | R—SiCl$_3$. |

The multilayer 4A is preferably formed on undercoat 6 by evaporation of a solvent from a film of uniform thickness, said film being a solution of the nm-scale particles in a solvent such as dodecane.

The nm-scale particles 1 in FIG. 4 may preferably have a chemical composition and size distribution as described above in reference to FIG. 2. Broadly, the magnetic material should be selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite. More particularly, the particles may preferably be composed of a ferromagnetic transition metal (Co, Fe or Ni), or are binary alloys of Co, Fe and Ni, or ternary alloys of these elements. Optionally, the particles may be a CoPt alloy (Co$_n$Pt with n=1, 3 or 0.33) with CoPt (n=1) being the easiest to fabricate, the compositions of said alloys being uniform throughout the nanoparticle. Optionally, each particle has a 2 layer structure consisting of a ferromagnetic core (Co, Fe, Ni) surrounded by a noble metal layer ("shell" of Pt, Au, Ag, Pd). The diameter of the particles should be 5–15 nm, and the standard deviation of the distribution of the particle diameters should preferably be <7%, with 5 % (or less) being most preferred.

FIG. 5 is a section view of an alternative magnetic recording medium that consists of 2 layers of ordered monodisperse nm-scale Co particles 1, with a protective coating 7B deposited between layers 4B and 4C of nm-scale particles 1. As shown in FIG. 5, the recording medium comprises a substrate 5, an undercoat 6 on the substrate (preferably but not necessarily of affinity material as described hereinabove), a first layer 4B of nm-scale particles 1 (an ordered array as in FIG. 3), a first protective coating layer 7B, a second layer 4C of nm-scale particles 1 (another ordered array as in FIG. 3), and a second protective coating layer 7C. The substrate 5 may be either rigid (such as glass, or a Si wafer) or flexible, such as a polymeric plastic disc. A coating 6 ("undercoat") is applied to the substrate to promote ordered multilayer formation. The thickness of the first overcoating 7B may be adjusted to change the interaction of the first ordered monolayer 4B with the second monolayer 4C.

Optionally, the structure of FIG. 6A may continue with more layers, as will be readily understood.

Figure 6:
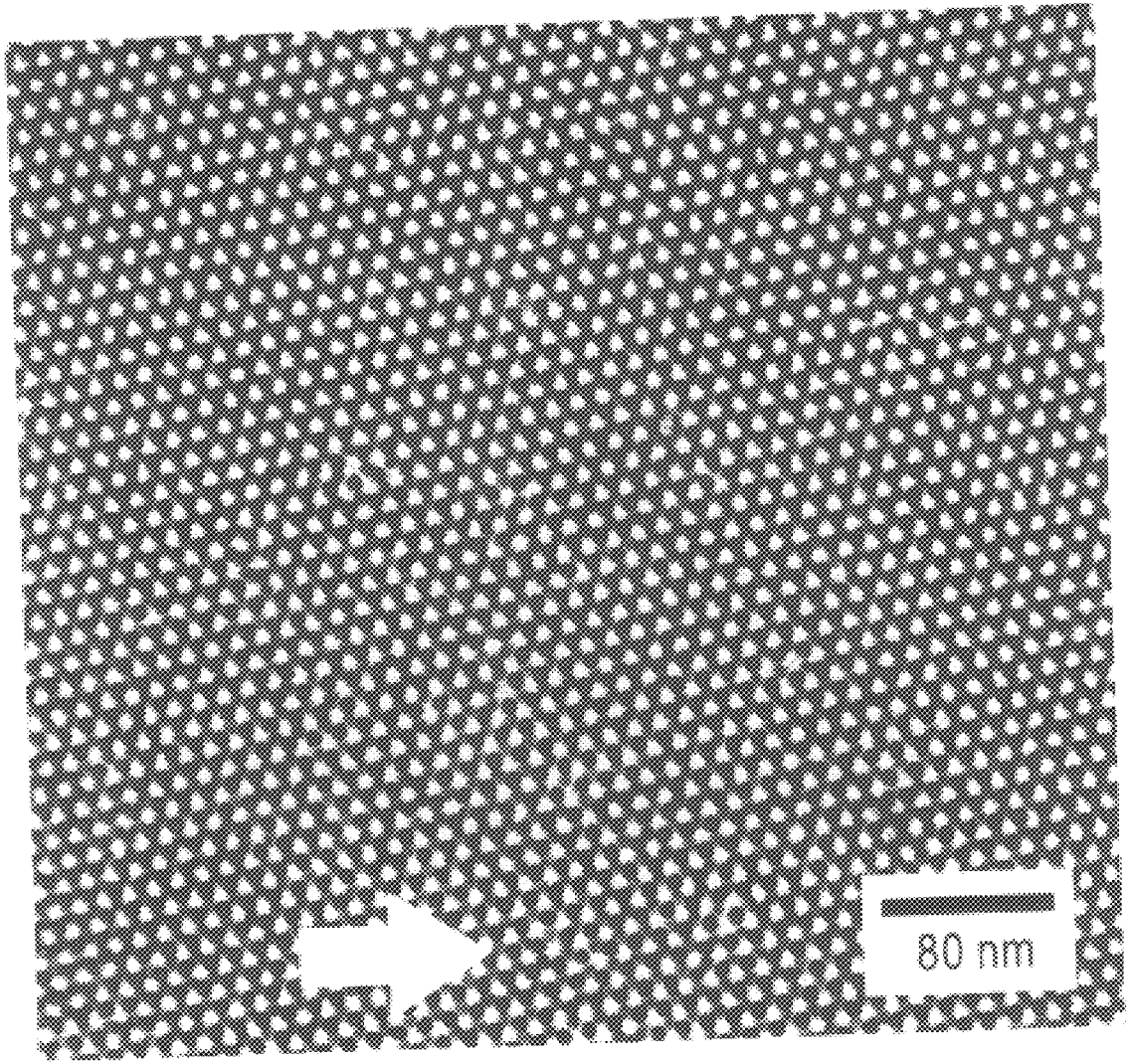
FIG. 6 is a transmission electron micrograph (TEM) photo of an ordered multilayer of Co particles of FIG. 4, each black dot being a single 8 nm. diameter Co particle.

FIG. 6 is a transmission electron micrograph (TEM) photo of an ordered multilayer of Co particles of FIG. 4, each black dot being a single 8 nm. diameter Co particle. The top-most layer appears black, and a missing Co particle is highlighted by the while arrow (this is a defect in the ordered multilayer array). The second layer down appears as gray dots. The multilayer 4A of FIG. 4 is formed by solvent evaporation from a solution of the same particles described above in reference to FIG. 2, which depicts formation of an ordered monolayer), but in the multilayer case a higher temperature may preferably be used to increase the particle mobility and to remove solvent at a faster rate. For example, the multilayer whose TEM photo is shown in FIG. 6 was prepared at 60° C.

As noted herein, the "undercoat" layer 6 on the substrate 5 may comprise an affinity material which enables the formation of chemical links between the particles 1 and the substrate 5. Such an affinity material comprises bi-functional molecules of the form X-R-Y, wherein R is selected from hydrocarbon and fluorocarbon chains of between 3 and 22 carbon atoms, and X and Y are selected from:

| | |
|---|---|
| sulfonic acids | R—SO$_2$OH |
| sulfinic acids | R—SOOH |
| phosphinic acids | R$_2$POOH |
| phosphonic acids | R—OPO(OH)$_2$ |
| carboxylic acids | R—COOH |
| thiols | R—SH |
| trismethoxysilane | R—Si(OCH$_3$)$_3$ |
| trisethoxysilane | R—Si(OCH$_2$CH$_3$)$_3$ |
| trichlorosilane | R—SiCl$_3$. |

Preferably, at one end of the bi-functional molecule there is a tri-alkoxysilane group (trimethoxy- and triethoxy-silanes being preferred), which will link covalently to SiO2 and metal oxide surfaces. A glass substrate, or Si wafer coated with SiO2, or a metal oxide coating on the substrate is preferably used. Preferably, at the other end of the bifunctional molecule there is a carboxylic acid, phosphonic acid, phosphinic acid, sulphonic acid, sulphinic acid, or thiol group. In the cases of carboxylic acid and thiol, these groups form strong carboxilate or thiolate linkages, respectively, with a metal nm-scale particle or with a noble metal (gold, silver, platinum or palladium) coating on the particle. Between the two ends there is a hydrocarbon chain.

Figure 7A:
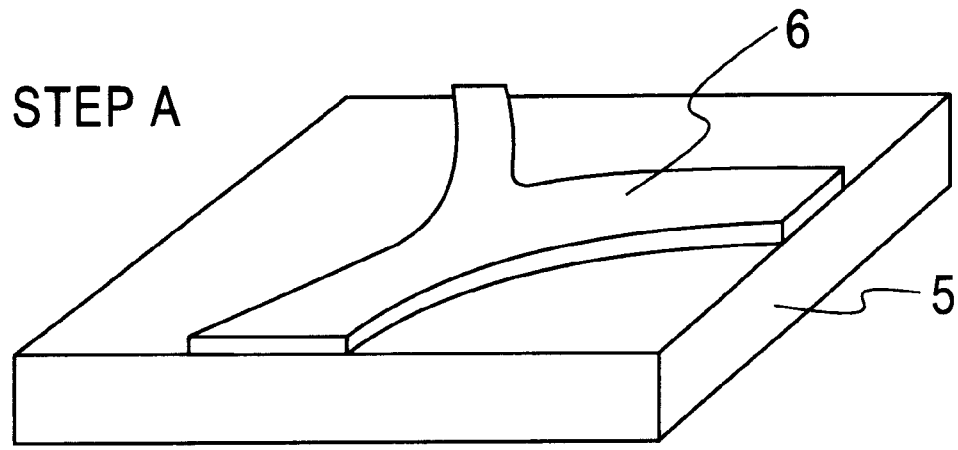
FIGS. 7a and 7b show the general method to locally modify the properties of different regions of the substrate.
Figure 7B:
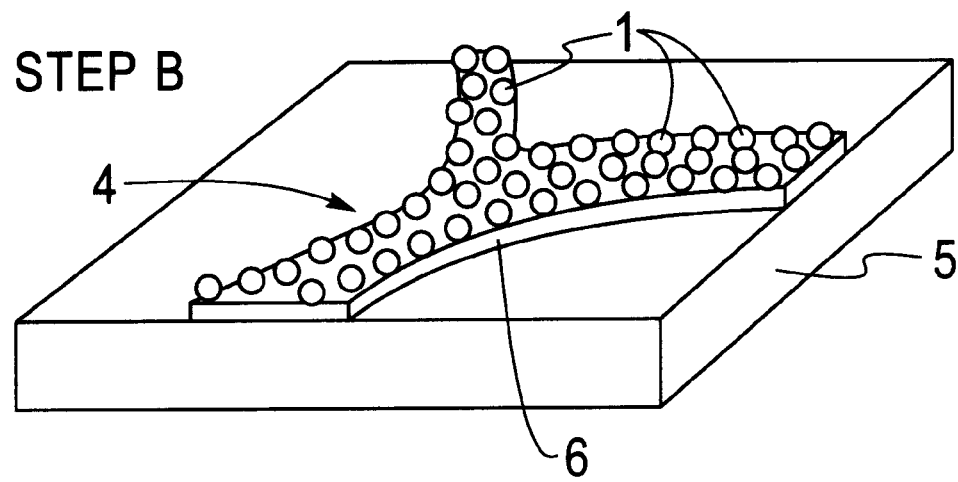

A general method to locally modify the properties of different regions of the substrate is depicted in FIG. 7. FIG. 7 shows a method of the present invention, and by this method it is possible to create an ordered monolayer of nm-scale particles in selected regions of a substrate surface, while leaving the remaining regions of the surface free of said particles. According to this method, selected regions of the substrate 5 can be made with customized properties by selective placement of ordered arrays (layers 4) of nm-scale particles 1. To accomplish selective placement of particles 1, the undercoat layer 6 on the substrate comprises an affinity material (enabling the formation of chemical links between the particles 1 and the substrate 5), and the undercoat layer 6 (affinity coating) is patterned as shown in Step A of FIG. 7 using standard lithographic methods. The pattern of the affinity coating may have any shape, either geometric or an arbitrary shape, as shown in FIG. 7.

After patterning the affinity layer 6 as in Step A of FIG. 7, the ordered monolayer array of nm-scale particles is formed by the methods described above in reference to FIG. 2. The result of the fabrication process with a patterned affinity coating is Step B of FIG. 7, where ordered layers 4 of nm-scale particles 1 are then formed only in the selected regions covered with affinity coating 6. The selected regions then have the properties of the nm-scale particle layer 4. The remaining regions without the affinity coating maintain the properties of the original surface of substrate 5.

While the present invention has been described with reference to preferred embodiments thereof in order to facilitate a better understanding of the invention, those skilled in the art will recognize that the invention can be embodied in various ways without departing from the scope and spirit of the invention as set forth in the appended claims.

What is claimed is:

1. A magnetic storage medium comprising:
   a) a substrate having a surface,
   b) a layer of particles disposed in a substantially uniformly spaced-apart relationship upon said surface, said particles having a substantially uniform diameter not exceeding 50 nanometers, said particles comprising a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite,
   c) a coating surrounding said particles and adhering to said surface to maintain said substantially equally spaced-apart relationship, and
   d) an affinity layer disposed between said layer of particles and in a selected pattern over at least part of said surface of said substrate.

2. A magnetic storage medium as set forth in claim 1, said magnetic storage medium comprising an abrasion-resistant coating disposed over said particles to protect them from abrasion.

3. A magnetic storage medium as set forth in claim 1, said particles being coated with a noble metal material selected from the group consisting of gold, silver, platinum, and palladium.

4. A magnetic storage medium as set forth in claim 2, said abrasion-resistant coating comprising a material selected from the group consisting of diamond-like-carbon, amorphous carbon, amorphous silicon, aluminum oxide, and silicon oxide.

5. A magnetic storage medium as set forth in claim 4, said particles having a diameter not exceeding 20 nanometers.

6. A magnetic storage medium as set forth in claim 1, said layer comprising a multilayer formed of substantially equally spaced-apart particles disposed at a plurality of distances from said surface of said substrate.

7. A magnetic storage medium as set forth in claim 1 or 6, said affinity layer comprising an affinity material adapted to preferentially attract and retain said particles in said selected pattern over said surface.

8. A magnetic storage medium as set forth in claim 1 or 6, said affinity layer comprising bi-functional molecules of the form X-R-Y, wherein R is selected from hydrocarbon and fluorocarbon chains of between 3 and 22 carbon atoms, and X and Y are selected from:

| | |
|---|---|
| sulfonic acids | R—SO$_2$OH |
| sulfinic acids | R—SOOH |
| phosphinic acids | R$_2$POOH |
| phosphonic acids | R—OPO(OH)$_2$ |
| carboxylic acids | R—COOH |
| thiols | R—SH |
| trismethoxysilane | R—Si(OCH$_3$)$_3$ |
| trisethoxysilane | R—SI(OCH$_2$CH$_3$)$_3$ |
| trichlorosilane | R—SiCI3. |

9. A magnetic storage medium as set forth in claim 8, wherein said surface of said substrate is silicon dioxide, said particles are coated with a noble metal selected from the group consisting of gold, silver, platinum, and palladium, and wherein said affinity material comprises trismethoxysilylpropane thiol, having a formula of (CH$_3$O)$_3$Si—CH$_2$—CH$_2$—CH$_2$—SH.

10. A magnetic storage medium as set forth in claim 1, said layer comprising a monolayer of said particles.

11. A magnetic storage medium as set forth in claim 1, said particles having diameters characterized by a standard deviation of less than 10% of their average.

12. A magnetic storage medium as set forth in claim 10, said layer further comprising a second monolayer of said particles disposed over said coating.

13. A method of forming a magnetic storage medium upon a surface of a substrate comprising:
   a) preparing a liquid dispersion, in a solvent, of magnetic particles coated with an organic stabilizer material, said magnetic particles having a substantially uniform diameter not exceeding 50 nanometers, said particles comprising a magnetic material selected from the group consisting of elements Co, Fe, Ni, Mn, Sm, Nd, Pr, Pt, Gd, an intermetallic compound of the aforesaid elements, a binary alloy of said elements, a ternary alloy of said elements, an oxide of Fe further comprising at least one of said elements other than Fe, barium ferrite, and strontium ferrite,
   b) applying said liquid dispersion to said surface of said substrate, and
   c) evaporating said solvent to thereby form, upon said surface of said substrate, a layer of said magnetic particles coated with said organic stabilizer material, said magnetic particles being maintained in a substantially uniformly spaced-apart relationship upon said surface by said organic stabilizer material.

14. A method as set forth in claim 13, further comprising:
d) removing said organic stabilizer material, and
e) depositing an adherent coating over said particles to maintain them in said substantially uniformly spaced-apart relationship.

15. A method as set forth in claim 14, wherein said removing of said organic stabilizer material is carried out using at least one of heating, dry etching, and vacuum.

16. A method as set forth in claim 13, said organic stabilizer material comprising a long chain organic compound of the form R-X,
where R is a member selected from the group consisting of 1) a hydrocarbon chain in straight or branched formation, said hydrocarbon chain comprising 6 to 22 carbon atoms, and 2) a fluorocarbon chain in straight or branched formation, said fluorocarbon chain comprising 6 to 22 carbon atoms, and
where X is selected from carboxylic acid, phosphonic acid, phosphinic acid, sulfonic acid, sulfinic acid, and thiol.

17. A method as set forth in claim 13, where said organic stabilizer material comprises oleic acid.

18. A method as set forth in claim 14, said adherent coating comprising an abrasion-resistant material selected from the group consisting of diamond-like-carbon, amorphous carbon, amorphous silicon, aluminum oxide, and silicon oxide.

19. A method as set forth in claim 13, further comprising, prior to said applying of said liquid dispersion, applying an affinity layer in a selected pattern over at least part of said surface of said substrate,
said affinity layer being comprised of an affinity material chosen to preferentially attract and retain said particles in said selected pattern over said surface, said affinity material comprising bi-functional molecules of the form X-R-Y, wherein R is selected from hydrocarbon and fluorocarbon chains of between 3 and 22 carbon atoms, and X and Y are selected from:

| | |
|---|---|
| sulfonic acids | R—$SO_2$OH |
| sulfinic acids | R—SOOH |
| phosphinic acids | $R_2$POOH |
| phosphonic acids | R—OPO(OH)$_2$ |
| carboxylic acids | R—COOH |
| thiols | R—SH |
| trismethoxysilane | R—Si(OCH3)$_3$ |
| trisethoxysilane | R—Si(OCH$_2$CH$_3$)$_3$ |
| trichlorosilane | R—SiCl$_3$. |

20. The magnetic storage medium according to claim 1, wherein said substantially uniform diameter of said magnetic particles has a standard deviation of less than 10% of their average.

* * * * *